(12) United States Patent
Fina

(10) Patent No.: US 12,164,024 B2
(45) Date of Patent: Dec. 10, 2024

(54) METHODS AND SYSTEMS FOR ESTIMATING RAIN RATE VIA VEHICLE IMAGING RADAR

(71) Applicant: Waymo LLC, Mountain View, CA (US)

(72) Inventor: Michael Fina, Glen Ellyn, IL (US)

(73) Assignee: Waymo LLC, Mountain View, CA (US)

( * ) Notice: Subject to any disclaimer, the term of this patent is extended or adjusted under 35 U.S.C. 154(b) by 382 days.

(21) Appl. No.: 17/658,630

(22) Filed: Apr. 8, 2022

(65) Prior Publication Data

US 2023/0236317 A1    Jul. 27, 2023

Related U.S. Application Data

(60) Provisional application No. 63/302,018, filed on Jan. 21, 2022.

(51) Int. Cl.
　　*G01S 13/95*　　　(2006.01)
　　*B60W 40/02*　　　(2006.01)
　　*G01S 7/288*　　　(2006.01)

(52) U.S. Cl.
CPC .......... *G01S 13/951* (2013.01); *B60W 40/02* (2013.01); *G01S 7/2883* (2021.05); *B60W 2555/20* (2020.02)

(58) Field of Classification Search
CPC .... G01S 13/951; G01S 7/2883; G01S 13/931; G01S 7/4043; G01S 7/412; G01S 13/89; G01S 13/956; G01S 7/4047; B60W 40/02; B60W 2555/20
See application file for complete search history.

(56) References Cited

U.S. PATENT DOCUMENTS 10,371,863 B2　　8/2019　Leeds
11,137,493 B2 *　10/2021　Flores Tapia ......... G01S 13/956
(Continued)

FOREIGN PATENT DOCUMENTS

CN　　109683163 A　　4/2019
CN　　112816986 A　　5/2021
(Continued)

OTHER PUBLICATIONS

V. Sharma and L. Kumar, "Photonic-Radar Based Multiple-Target Tracking Under Complex Traffic-Environments," in IEEE Access, vol. 8, pp. 225845-225856, 2020, doi: 10.1109/ACCESS.2020.3045055 (Year: 2020).*

(Continued)

*Primary Examiner* — Olumide Ajibade Akonai
*Assistant Examiner* — Yonghong Li
(74) *Attorney, Agent, or Firm* — McDonnell Boehnen Hulbert & Berghoff LLP

(57) ABSTRACT

Example embodiments relate to techniques for using vehicle image radar to estimate rain rate and other weather conditions. A computing device may receive radar data from a radar unit coupled to a vehicle. The radar data can represent the vehicle's environment. The computing device may use the radar data to determine a radar representation that indicates backscatter power and estimate, using a rain rate model, a rain rate for the environment based on the radar representation. The computing device may then control the vehicle based on the rain rate. In some examples, the computing device may provide the rain rate estimation and an indication of its current location to other vehicles to enable the vehicles to adjust routes based on the rain rate estimation.

20 Claims, 13 Drawing Sheets

(56) References Cited

U.S. PATENT DOCUMENTS

| | | | |
|---|---|---|---|
| 2015/0094908 A1 | 4/2015 | Hirota | |
| 2017/0357029 A1* | 12/2017 | Lakshmanan | G06Q 10/04 |
| 2018/0164119 A1* | 6/2018 | Becker | B60W 60/001 |
| 2020/0191914 A1 | 6/2020 | Kunz | |
| 2020/0309533 A1* | 10/2020 | Young | G01C 21/28 |
| 2021/0120730 A1 | 4/2021 | Anderson | |
| 2022/0075025 A1* | 3/2022 | Kardassakis | G01S 13/931 |

FOREIGN PATENT DOCUMENTS

| | | |
|---|---|---|
| DE | 102015003115 B4 | 10/2021 |
| JP | 06638702 B2 | 1/2020 |
| KR | 1131194 B1 | 3/2012 |
| WO | 2021055646 A1 | 3/2021 |

OTHER PUBLICATIONS

Wang et al., "Vehicle Detection and Width Estimation in Rain by Fusing Radar and Vision", 15th International Conference on Control, Automation, Robotics and Vision (2018) https://ieeexplore.ieee.org/abstract/document/8581246.

Zhang et al., "The Impact of Adverse Weather Conditions on Autonomous Vehicles: How Rain, Snow, Fog, and Hail Affect the Performance of a Self-Driving Car", IEEE Vehicular Technology Magazine, vol. 14, No. 2 (2019) https://ieeexplore.ieee.org/document/8666747.

* cited by examiner

METHODS AND SYSTEMS FOR ESTIMATING RAIN RATE VIA VEHICLE IMAGING RADAR

CROSS REFERENCE TO RELATED APPLICATION

The present patent application claims priority to U.S. Provisional Application No. 63/302,018, filed on Jan. 21, 2022, which is hereby incorporated by reference in entirety.

BACKGROUND

Radio detection and ranging systems ("radar systems") are used to estimate distances to features in an environment by emitting radio signals and detecting returning reflected signals. Distances to radio-reflective features in the environment can be determined according to the speed of light time delay between signal transmission and reception. A radar system can use knowledge of the transmit waveform with coherent processing techniques to increase signal-to-noise ratio (SNR) and further improve the quality of radar estimates and performance. In one common example, a radar system can emit a signal where frequency varies linearly in time during one or more transmit pulses; upon receive, each signal may be compressed (either digitally or in hardware, using stretch processing architecture), at which point response ranges are encoded in frequency. A Discrete Fourier Transform (DFT) may be used to convert the time-domain signal response to frequency from which target ranges may be resolved directly from the corresponding range bins.

Some radar systems may emit a number of repeated pulses within a coherent processing interval (CPI) to perform Doppler processing techniques. In such systems, another DFT is run on the range compressed (or matched filtered) response data to estimate the relative motion of reflective objects based on Doppler frequency shifts in the received reflected signals.

Directional antennas may be used to improve gain at bearings of interest that can improve transmission and/or reception power over an isotropic antenna. Non-collocated transmit and/or receive elements on an antenna or phased array may be used to construct a virtual aperture. The response data collected may be used to sample the signal's wavefront within the same CPI to estimate the direction of arrival of the response signal through beamforming or spatial processing. More generally, directional antennas can also be used to focus radiated energy on a given field of view of interest. Combining the measured distances and the directional information can allow for the surrounding environment features to be mapped.

SUMMARY

Example embodiments describe techniques for estimating rain rate (and other atmospheric weather conditions where the automotive radar's radio frequencies, or RF, are sensitive, such as snow) using one or more vehicle imaging radars. Disclosed estimation techniques can be used to adapt a vehicle to its surrounding environment, which may involve adjusting system performance models, modifying detection thresholds and/or modifying (sensor, perception and/or behavior) processing during operations (e.g., vehicle navigation) to optimize performance for the estimated weather conditions. Dispersed systems can communicate rain rates and other weather measurements to each other and/or a central system, which can allow real-time weather condition mapping. For instance, vehicles can use compiled weather data to determine routes that avoid areas with adverse weather conditions.

In one aspect, an example method is provided. The method involves receiving, at a computing device, radar data from one or more radar units coupled to a vehicle. The radar data represents an environment of the vehicle. The method also involves determining a radar representation that indicates backscatter power based on the radar data and estimating, by the computing device using a rain rate model, a rain rate for the environment based on the radar representation. The method further involves controlling the vehicle based on the rain rate.

In another aspect, an example system is provided. The system includes a vehicle having one or more radar units and a computing device. The computing device is configured to receive radar data from the radar unit(s). The radar data represents an environment of the vehicle. The computing device is further configured to determine a radar representation that indicates backscatter power based on the radar data and estimate, using a rain rate model, a rain rate for the environment based on the radar representation. The computing device is also configured to control the vehicle based on the rain rate.

In yet another example, an example non-transitory computer readable medium is provided. The non-transitory computer readable medium is configured to store instructions, that when executed by a computing device, causes the computing device to perform operations. The operations involve receiving radar data from one or more radar units coupled to a vehicle. The radar data represents an environment of the vehicle. The operations also involve determining a radar representation that indicates backscatter power based on the radar data and estimating, using a rain rate model, a rain rate for the environment based on the radar representation. The operations further involve controlling the vehicle based on the rain rate.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
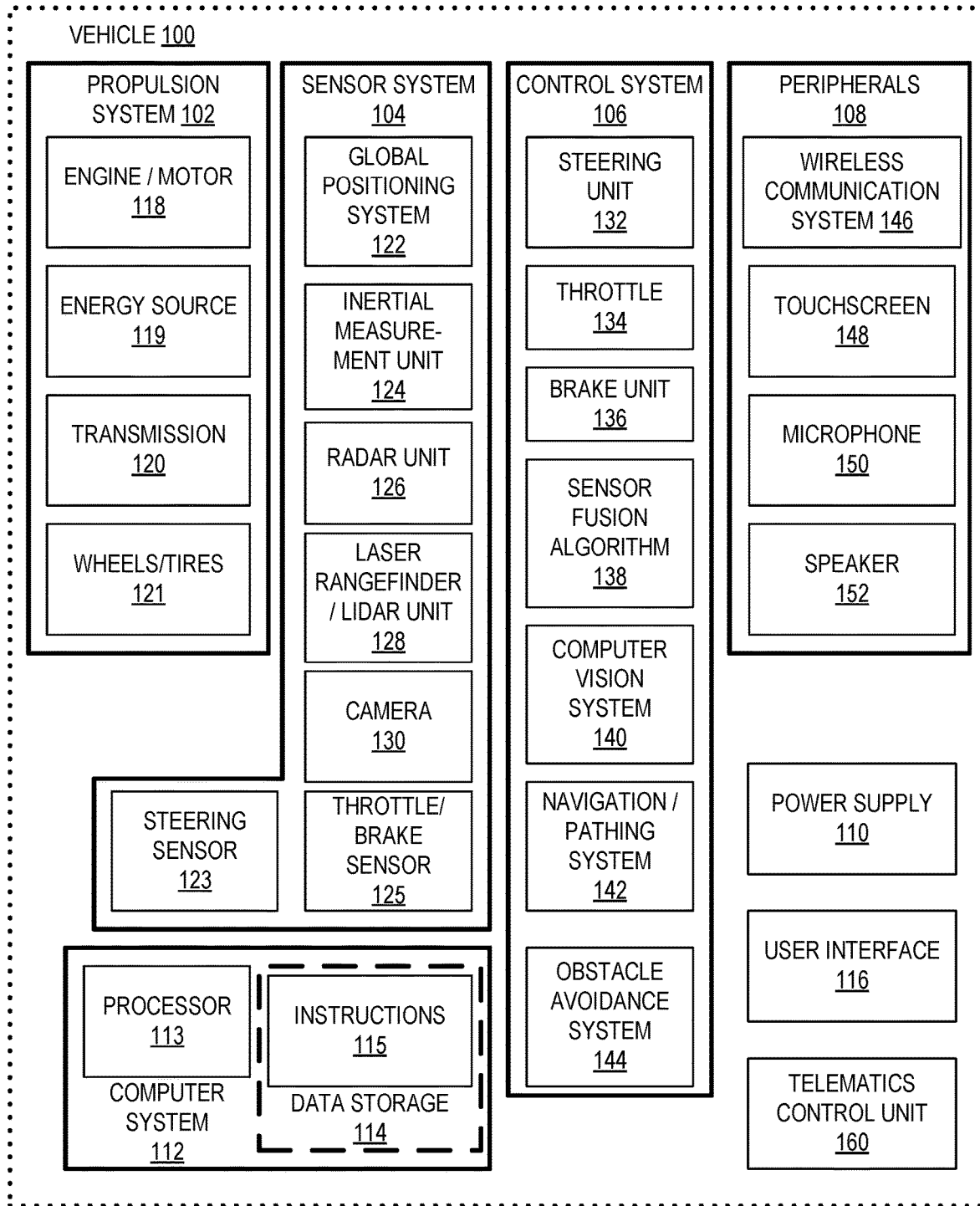
FIG. 1 is a functional block diagram illustrating a vehicle, according to one or more example embodiments.
Figure 2A:
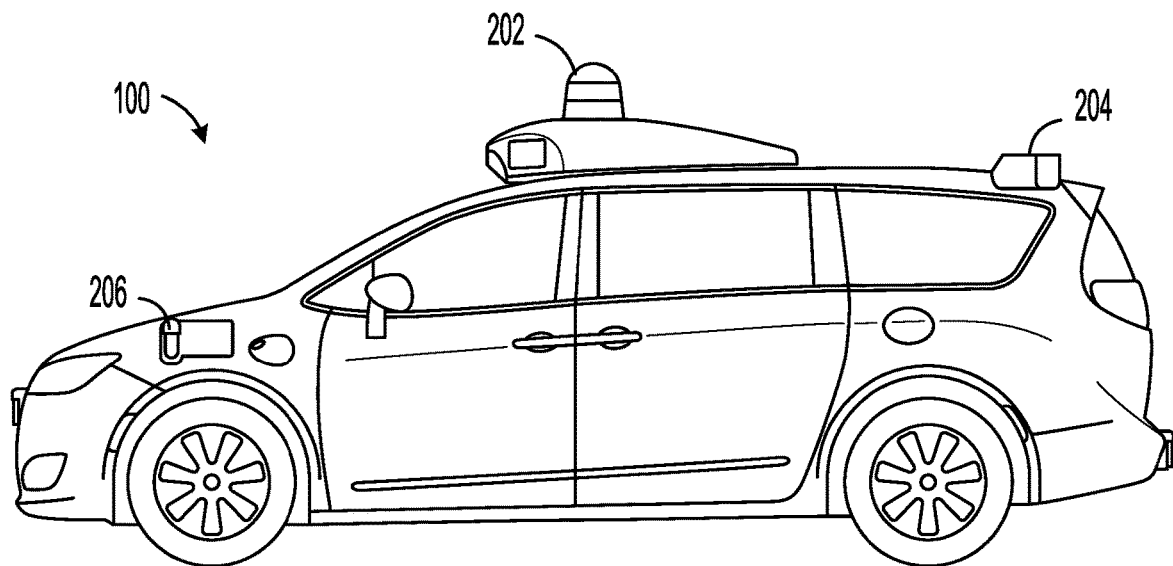
FIG. 2A illustrates a side view of a vehicle, according to one or more example embodiments.
Figure 2B:
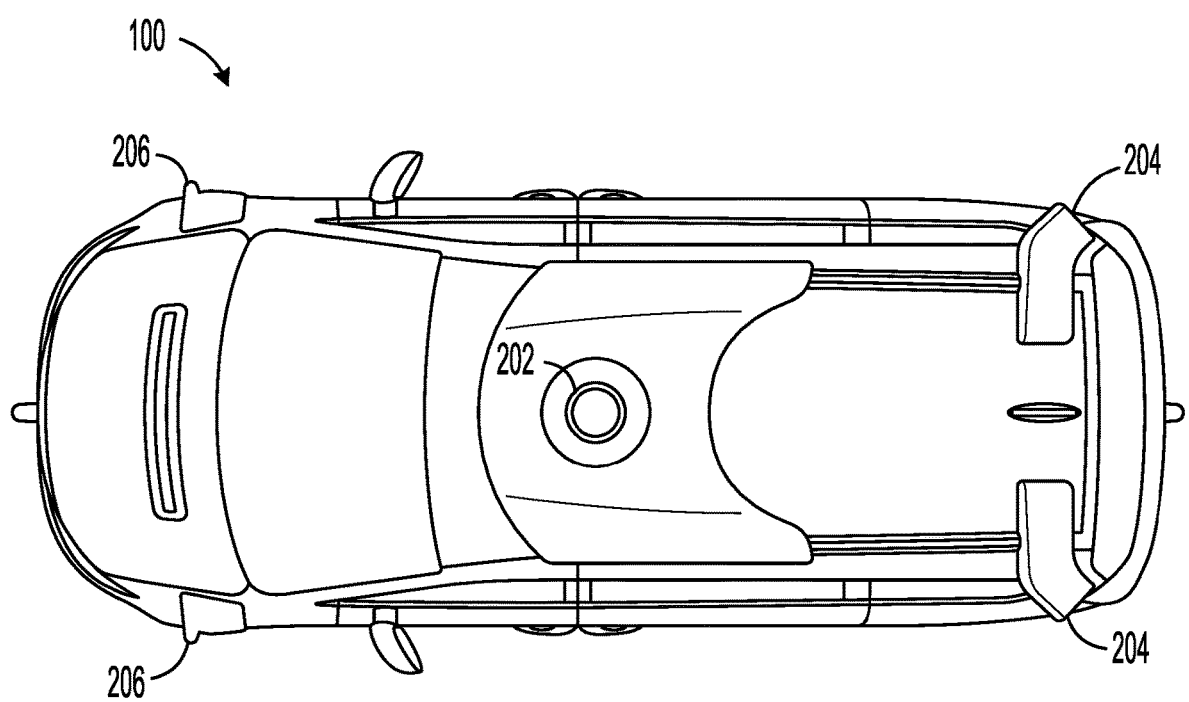
FIG. 2B illustrates a top view of a vehicle, according to one or more example embodiments.
Figure 2C:
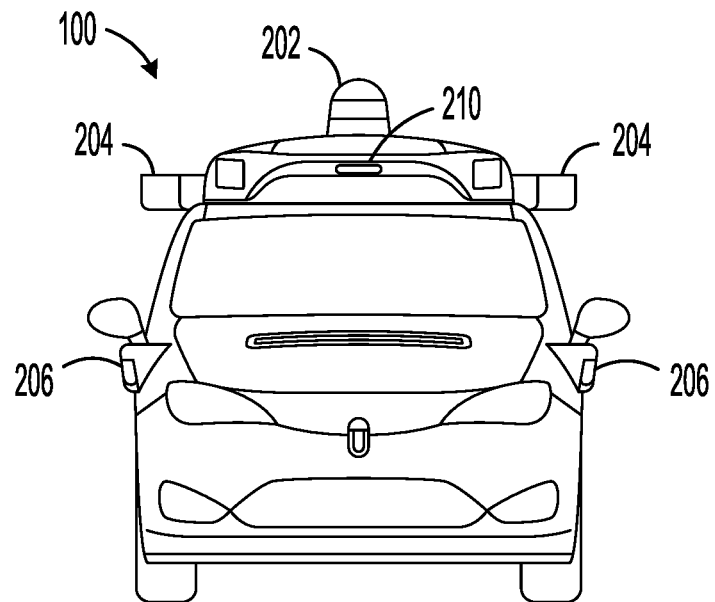
FIG. 2C illustrates a front view of a vehicle, according to one or more example embodiments.
Figure 2D:
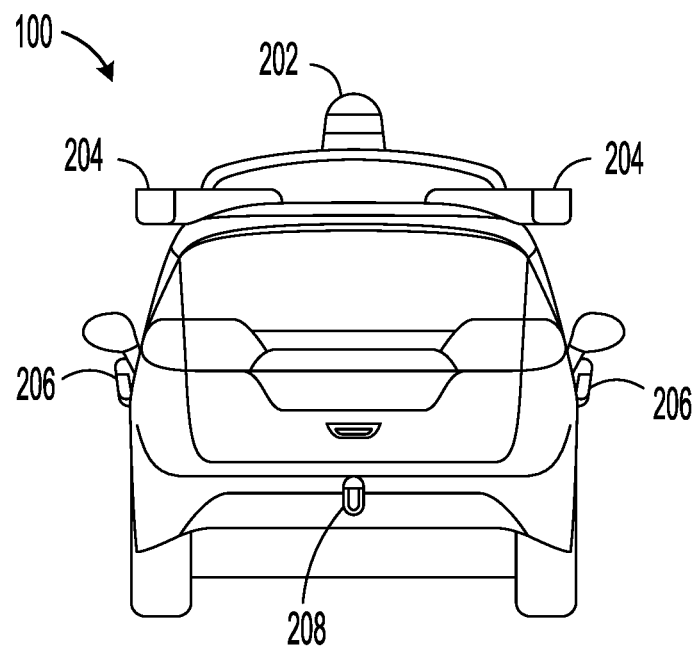
FIG. 2D illustrates a back view of a vehicle, according to one or more example embodiments.
Figure 2E:
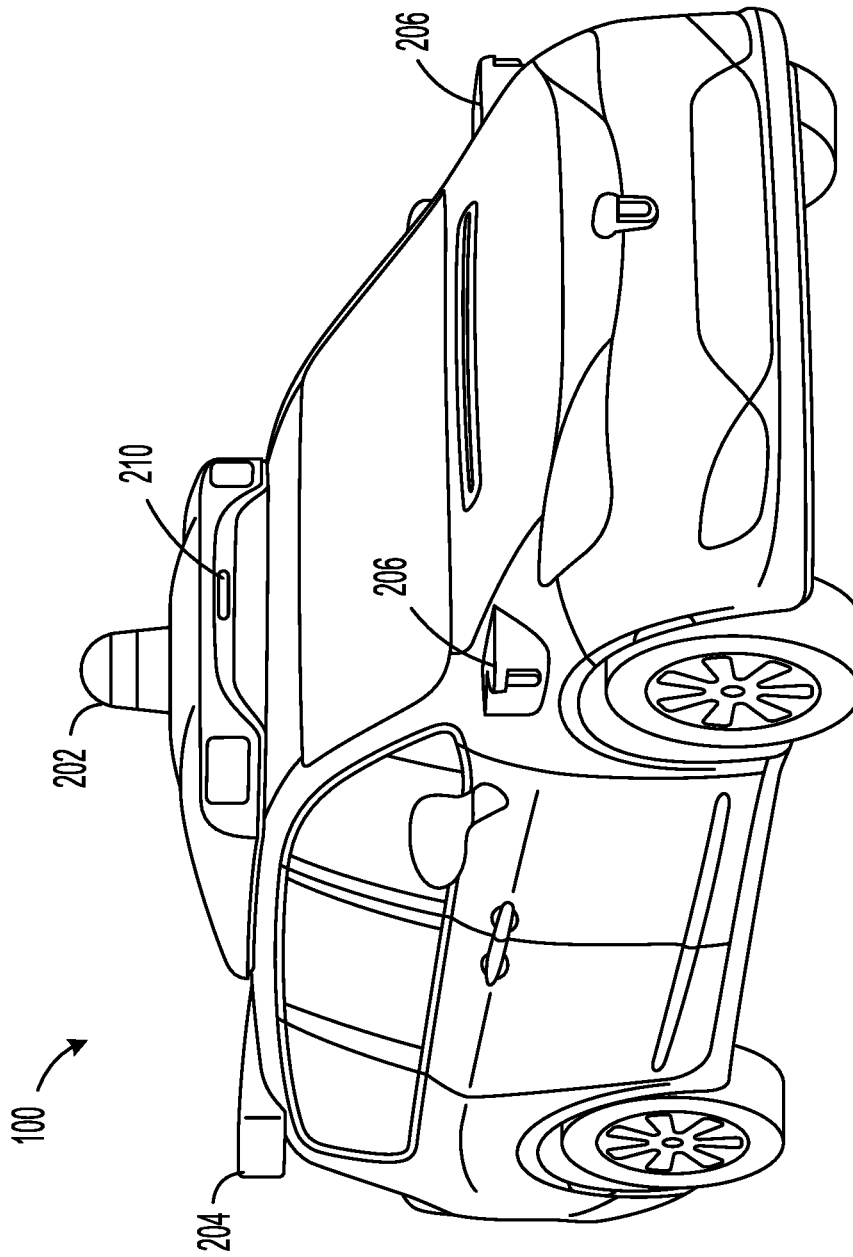
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system can detect objects by transmitting electromagnetic signals (radar signals) and analyzing the backscattered signals from the objects and other surfaces in the environment. The system can detect an object by transmitting short pulses and/or coded waveforms, such as a pulsed Doppler radar that involves a coherent burst of short pulses of a certain carrier frequency. In some applications, electromagnetic energy is concentrated to a particular spatial sector in the form of a beam via a parabolic reflector or an array of antenna elements associated with a radar unit. As such, a radar processing system (e.g., a computing device) can process radar data to generate two dimensional (2D) and/or three dimensional (3D) measurements that represent aspects of the environment, such as the positions, orientations, and movements of nearby objects and other surfaces occupying the environment near the radar system. In some cases, radar can provide range data, Doppler data, azimuth data, and/or elevation data for objects and surfaces in the surrounding environment.

Because a radar system can provide information about nearby objects and other detected surfaces, vehicles are increasingly incorporating radar systems to enable autonomous and/or semi-autonomous vehicle navigation. Vehicle radar can be used for obstacle detection and avoidance and to measure other aspects of dynamic environments, such as road conditions.

Weather conditions can impact autonomous and driver-assist systems. Real-time knowledge of sensor performance impairments, such as arise from changes in weather conditions like rain or snow, can be critical to estimating relative and/or absolute sensor performance degradation, which may be used to update sensor-specific models and/or other downstream models (e.g., perception or behavior). Real-time knowledge of changes in weather can enable detection of aperture fouling and/or fouling rate, which then may be used to activate cleaning systems (e.g., radome heaters, puffers, wipers) and/or determining an optimally setting (e.g., cleaning frequency) to counteract aperture fouling while maintaining sensor or system margin to meet performance requirements for the degraded weather conditions. Estimation of rain and/or snow rates may be used to alert the system that it is entering a different weather-degraded operational driving domain (ODD) or may assist in classification of the ODD, which may be used to assess the state of the system for purposes of determining if the vehicle is safe to begin, continue or resume a trip.

Example embodiments presented herein relate to techniques for using radar to estimate rain rate and other weather conditions. Such techniques can be used to estimate the rate that rain is falling in a vehicle's surrounding environment, which can enable vehicle systems to implement adjustments in real-time and thereby increase vehicle performance during autonomous or semi-autonomous navigation. Real-time weather information (e.g., the rain rate or snow rate) can be used to identify sensor and system-level performance impairments. In turn, vehicle systems may operate sensor cleaning systems, provide weather-degraded corrections to downstream performance models used during sensor operation and processing, and modify system operations during navigation. In some embodiments, multiple vehicles (e.g., a fleet of vehicles) and/or systems (e.g., roadside infrastructure or Doppler radar) may perform disclosed techniques to estimate and subsequently share weather conditions (e.g., onboard meteorology), which can produce and/or improve real-time weather maps that can be used to redirect vehicle navigation to areas less affected by environmental impacts and/or estimate times when routes may be suitable to resume navigation.

The disclosed techniques may likewise be applied to other types of automated systems which may deploy imaging radars. That is, "vehicle" in the foregoing embodiments is not limited to automated vehicles and may include such applications as boating, avionics (e.g., helicopters), robotics, and industrial machinery (e.g., farming and mining).

Radar can be acutely sensitive to precipitation (e.g., rain, snow, and road spray) in the radar's field of view. In practice, radar rain rate estimation can rely on backscatter in rain that follows a theoretical relationship with rain rate (e.g., based on Mie Scattering and assuming a Laws-Parsons Drop-size distribution), known as a radar cross section (RCS) relationship and background responses, which may be low and unbiased relative to rain backscattering response. By leveraging this relationship, a computing device may estimate the rain rate occurring within an environment using radar imagery. In addition, the computing device may perform similar operations to estimate snow rates (e.g., the rate at which snow is falling in an environment) or detect the rates associated with other types of weather conditions (e.g., hail). For instance, for snow rate estimation, a drop-size distribution and dielectric constant values for snow can be used by the computing device. Atmospheric precipitation type may be determined using, for example, onboard vehicle temperatures, offboard weather meteorology, algorithms using visual identification on camera aperture, and/or other onboard detectors that have selectivity between precipitation types (e.g., degrade quicker in snow versus rain).

In some examples, rain rate estimation method involves using post-processed radar data, such as 2D or 3D radar imagery. In the following example 3D radar is considered; processing for a 4D radar is analogous but would additionally consider elevation reponse. For instance, automotive radars can use a series of Fast Fourier Transforms (FFTs) and projections to form a 2D image representations of response power, such as a range-Doppler map and/or a range-azimuth spatial map. The 2D images may include pixels corresponding to FFT bins (or filters) that indicate the response power occurring at the appropriate dimension (e.g., range, Doppler, or azimuth) of the corresponding image. As such, a field programmable gate array (FPGA) or another computing device associated with one or more radars can initially compute the elevated radar response power detected within radar returns received from reflections off the environment. In some instances, the elevated radar response may be due to precipitation backscattering directly on range-Doppler-azimuth filters of interest and may be distinguishable from normal background power observed in the bins of interest. The computed power can then be used in conjunction with a theoretical and/or empirical model fit against meteorology truth data (e.g., a rain rate model) to determine when the power is indicative of precipitation (e.g., rain or snow) in the vehicle's environment. The computing device can estimate the rain rate in the surrounding environment based on the level of power relative to the model.

In some cases, the computing device may run an onboard rain rate estimator using incoming radar data to alert other vehicle systems to the presence and amount of rain in the vehicle's environment. Vehicle systems may then adjust performance based on the presence and amount of rain in the vehicle's environment, which can increase vehicle performance and safety during navigation. For instance, the vehicle control system can increase following distance and apply brakes earlier when the estimated rain rate is above a threshold rain rate. The computing device can continuously operate the onboard rain rate estimator in some implementations. In other examples, the onboard rain rate estimator may operate periodically or in response to a triggering event.

Disclosed weather estimation techniques can be used in various applications, which may depend on the system performing the technique and environment factors. For instance, a system may use estimated weather conditions to adjust sensor parameters, initiating cleaning systems, and/or modifying subsystem operations. A vehicle may adjust autonomous navigation based on detecting a change in the rain rate in its environment. For instance, a computing device can use an estimated rain rate to determine sensor atmospheric loss and also to modify performance models used by sensors and/or for perception tasks. As an example, the computing device can adjust the max range of one or more radar or other onboard sensors based on estimated rain rate in real-time. As the estimated rain rate (or derived by-sensor-type atmospheric losses or max range values) may indicate a different precision-recall (P-R) curve should be used for perception or behavior models, the rain rate value may be used implicitly or explicitly to adjust the system's response to improve performance in different weather conditions, for example, by causing the system to rely on sensor inputs in a different ratio (e.g., model prefactors) in different weather.

Another application can involve using the estimated rain rate for detecting and estimating sensor fouling rate. The rain rate can be used to select the type of cleaning process and cleaning frequency based on the estimated sensor fouling. For instance, puffers, air spray, wipers, and/or heaters may be selected and used to clean sensors in some applications. The type of cleaning technique or techniques selected may depend on the type of vehicle sensor and/or other potential parameters, such as the rain rate or type of detected weather (e.g., snow or rain).

In some cases, a computing device can use the estimated weather condition (e.g., the rain rate) to detect when a vehicle has exceeded the vehicle's ODD and initiate a navigation response. The ODD can specify guidelines for vehicle system operations based on external environment conditions. For instance, an autonomous vehicle may need to decrease navigation speeds or avoid navigation when the rain rate exceeds a threshold rain rate, which may be due to local regulations or other potential constraints.

In some embodiments, estimated rain rates and other weather conditions (e.g., snowfall rate) can be accumulated from multiple vehicles and systems for trend analysis and to map meteorological information for different areas. For instance, a fleet of vehicles can determine and provide rain rate estimations and other weather data along with location data to a central system, which can monitor for trends and update a weather map that may be used by the vehicles during route planning. By sharing weather and location data, vehicles can determine and navigate routes that minimize exposure to areas with lots of rain and/or other undesirable weather conditions. This can help vehicles avoid flooded or icy roadways in some cases. As such, rain rate estimates may also be shared (or distributed) to other vehicles or other local weather services to reroute vehicles or temporarily suspend operation until weather conditions have passed. In addition, in some examples, rain rate estimates can be used by vehicle systems to restrict or resume driving capabilities when conditions exceed or re-enter the vehicle's permissible ODD, respectively.

In some instances, extinction (or transmission loss) can be difficult to estimate directly using radar data. The difficulties can arise due to scatterer scintillation and ground multipath. In practice, attempting to estimate atmospheric losses directly from dynamic scatterers in the scene can be difficult to use to get a stable signal to estimate for purposes of extrapolating atmospheric loss or for purposes of estimating rain rate. Although transmission loss may be difficult to directly measure, backscattering can provide a more stable signal that a computing device can use to estimate rain rate in some embodiments. In particular, in some instances, backscattering can provide a stable signal at ranges and bearings where large scatterers and road clutter are not located. As such, a rain rate relationship may be modeled and calibrated using elevated near-range backscatter response power to estimate rain rate. Modeling and calibration of the rain rate relationship may involve using theoretical models and/or empirical data in some embodiments. In other examples, the transmission loss estimate may also be desired, and the local rain rate derived from radar backscattering can be used with scattering models to extrapolate a stable atmospheric loss estimate over the radar's field of view. The range-dependent transmission loss estimates may be used to modify radar performance models which can modify the radar detection logic and thresholds by modifying the estimated probability of detection over the radar's field of view.

In some embodiments, radar images can be consumed by the estimators (e.g., a computing device), which can compute received power from backscattering from radar images. For instance, radar imagery can take the form of max-projected spatial power radar images and max-projected range-Doppler power radar images. For each selected CPI to evaluate the rain rate, the computing device may estimate backscattering or rain rate for any number of image bins with the aim of producing the representative estimates while mitigating false positive energy sources. In some instances, the associated rain rate estimation update rate is several (roughly 2-5) orders of magnitude faster than other instruments that estimate rain rate.

In some examples, a computing device located onboard a vehicle may perform a real-time technique for rain rate estimation using radar imagery. The technique can be used to estimate the local environmental rain rate using intermediate or post-processed radar data products. The computing device may then alert other vehicle systems to the presence and amount of rain in the vehicle's local environment. For a radar system, rain can represent a significant loss mechanism. For instance, rain, snow, or other weather conditions can impact vehicle radar systems operating in the automotive radar band (e.g., 76-81 Gigahertz (GHz)). In some embodiments, a vehicle may use a radar system that operates at a different RF band, which can be specialized to estimate the rain rate. In other embodiments, a vehicle may use a dedicated imaging radar with an arbitrary mount orientation (e.g., vertically mounted) to estimate the rain rate or other environmental weather conditions.

An accurate estimation of rain rate can be used to estimate atmospheric rain loss and modify one or multiple radar performance models used by a vehicle radar system and to also produce a radar rain-rate-corrected performance model that can be used. A performance model can be further corrected by including aperture loss effects and/or may be handed off to other vehicle systems. For other vehicle systems, real-time knowledge of sensor performance impairments from the environment rain can be used to estimate sensor performance degradation in rain. As such, onboard sensors may use rain rate to model degradation and possibly modify operation to optimize performance. In addition, cleaning systems may use rain rate to counteract aperture fouling when the vehicle's navigating in rain or other weather conditions. The results of the sensor performance model or direct use of rain rate estimates may further inform downstream perception and behavior systems for an autonomous or semi-autonomous vehicle. In some cases the formation of a system or sensor model against performance requirements such as max sensor range may be constructed from sensor atmospheric and aperture losses, in cases with an active cleaning system, the model may be used to determine the operational frequency of cleaning in order to meet the system or sensor requirement.

In some examples, onboard meteorology may be distributed to a fleet of vehicles and may be shared to produce real-time rain maps to redirect vehicles to areas where sensors can be less affected by environmental impacts. Distributed weather data can also be used to alert individual vehicles (or the fleet of vehicles) that a weather event is severe enough to ground the fleet in certain locations or restrict routes while the rain event passes.

In other examples, rain rate estimates may be used to facilitate offboard machine learning model evaluation and/or training. For instance, the rain rate estimates may be used individually or in conjunction with other weather data collected onboard and/or data from other offboard (e.g., third-party weather data) sources operating in nearby areas to form ground truth labels used to evaluate and/or train models. In some cases the rain rate estimates may first be converted to a discrete set (or classification) of rain rate intensity such as light, moderate, heavy, and violent rain. Once trained, the models may rely on the onboard radar rain rate estimates to determine vehicle response during navigation.

In some examples, understanding the rain rate can assist an autonomous system to operate autonomously in adverse weather conditions. In particular, knowledge of rain rate and other weather conditions may be used to inform the vehicle's control system that it may suffer from reduced traction. Detection of a non-zero rain rate may cause other systems to monitor for the presence of road spray. If the motion control system detects a non-zero rain rate, the control system may proportionally adjust vehicle operations to increase response time and increase vehicle following distance. The control system may also apply brakes earlier in such conditions.

Some examples may involve the direct measurement of rain (backscattering) using radar image data from one or more automotive radar(s). Some common examples of radar image data are projections into range-Doppler map and/or range-azimuth spatial map. So-called 4D radars (range, Doppler, azimuth, elevation) will have analogous projections into elevation and will likewise be able to make use of the following concepts. Any combination of the compressed power filters from these images are referred to as "response power". Using the response power from select image bins (filters), a computing device may be used to detect the presence of rain, the total amount of rainfall encountered and/or the local rate of rain (rain rate) by monitoring response power in radar images during navigation. In some cases while the vehicle is driving in active rain, the response signal (usually at near-range bins) may increase from backscattering off rain droplets in the air. In some cases, the increased response caused by rain backscatter may exceed the radar's background response power (from noise, other near-range responses such as from the vehicle's skin and/or environmental clutter) and may be used to provide an estimate of the backscatter power caused by rain in air. In some cases, the response may be statistically distinguishable from the conditions where no rain is present and lead the system to classify the environment as "raining". In some cases the absolute or relative excess power from one or more radars or an effective power found through combining their response power may be converted into a quantitative into a rain rate or integrated into a total rainfall measurement.

In some examples during navigation, road spray from vehicles driving in front of or overtaking the self-driving vehicle may also be sensed and otherwise detected instantaneously as additional raw backscattering power. In some cases, the combination of rain and road spray in backscattering estimate may be desired, for example, in cases involving cleaning system function. For purposes of rain rate detection estimation, however, road spray may lead to a source of false positives. In such a case, during the process of consolidating an effective backscatter metric, it is possible to choose averaging techniques in order to minimize the impact of road spray. For example, radar image bin selection, time averaging and the weighting of different raw sensor estimates may be used to mitigate the effect of road spray. These example techniques may allow a rain rate estimator to efficiently reject signals caused by road spray and therefore still be a robust estimator in the presence of road spray.

In addition, applications can stem from real-time knowledge of rain rate. Rain and other weather conditions can cause sensor degradation (e.g., aperture fouling) and may cause the vehicle to have false positive object detections. As such, potential mitigation performed in response to rain rate and other weather conditions can include sensor cleaning and calibration, adjusting sensor detection thresholds, and increasing following distance relative to other vehicles to maintain a safe buffer given the road conditions. Other mitigation techniques can also be performed. For instance, vehicles may share rain rate and other weather conditions in real-time, which can enable routes to be adjusted to avoid particular roads that may be suffering from poor conditions (e.g., a flooded road). In some embodiments, maps that are used by vehicles for route planning and navigation can be updated based on detected rain rate and other weather conditions. As a result, vehicles can utilize maps to avoid potential conditions that have adverse conditions during route planning. In further examples, weather reports and trends can be leveraged to predict which roads may have adverse conditions at a given time. For instance, a road that typically floods during rainfall may be proactively avoided by vehicles based on weather reports (e.g., an hourly weather forecast) and/or upon detection of rainfall or another type of precipitation.

In some examples, the degree of adjustment applied by vehicle systems can depend on the estimated rain rate. For instance, when techniques indicate a higher rain rate level, the vehicle may perform techniques designed for the higher level of precipitation and these techniques can differ from those performed for a low level of precipitation. Similarly, detection of rain or snow may also further contribute to additional adjustments by the vehicle control system. In addition, the vehicle system may also share information regarding road conditions with other nearby vehicles. For instance, the vehicle system can send a map that indicates the presence of rain rate and other weather conditions to other vehicles located within a threshold geographic distance relative to the roads with the rain rate and other weather conditions. In some examples, adverse conditions may lead to vehicle systems performing radome cleaning techniques. For instance, a vehicle may cause radar radomes to apply heat to eliminate sleet or snow that may impact potential radar measurements. In other examples, a radome can use a wiper or an air-blower to help remove precipitation positioned on the radome.

The following detailed description may be used with one or more radar units having one or multiple antenna arrays. The one or multiple antenna arrays may take the form of a single-input single-output (SISO), single-input, multiple-output (SIMO), multiple-input single-output (MISO), multiple-input multiple-output (MIMO), and/or synthetic aperture radar (SAR) radar antenna architecture. In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm or 4 mm). Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

An antenna array may involve a set of multiple connected antennas that can work together as a single antenna to transmit or receive signals. By combining multiple radiating elements (i.e., antennas), an antenna array may enhance the performance of the radar unit used in some embodiments. In particular, a higher gain and narrower beam may be achieved when a radar unit is equipped with one or more antenna arrays.

Antennas on a radar unit may be arranged in one or more linear antenna arrays (i.e., antennas within an array are aligned in a straight line). For instance, a radar unit may include multiple linear antenna arrays arranged in a particular configuration (e.g., in parallel lines on the radar unit). In other examples, antennas can also be arranged in planar arrays (i.e., antennas arranged in multiple, parallel lines on a single plane). Further, some radar units can have antennas arranged in multiple planes resulting in a three dimensional array. A radar unit may also include multiple types of arrays (e.g., a linear array on one portion and a planar array on another portion).

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some example embodiments, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/lidar unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/lidar 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 further includes power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict sensor position 202, sensor position 204, sensor position 206, sensor position 208, and sensor position 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radar units, LIDAR units, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
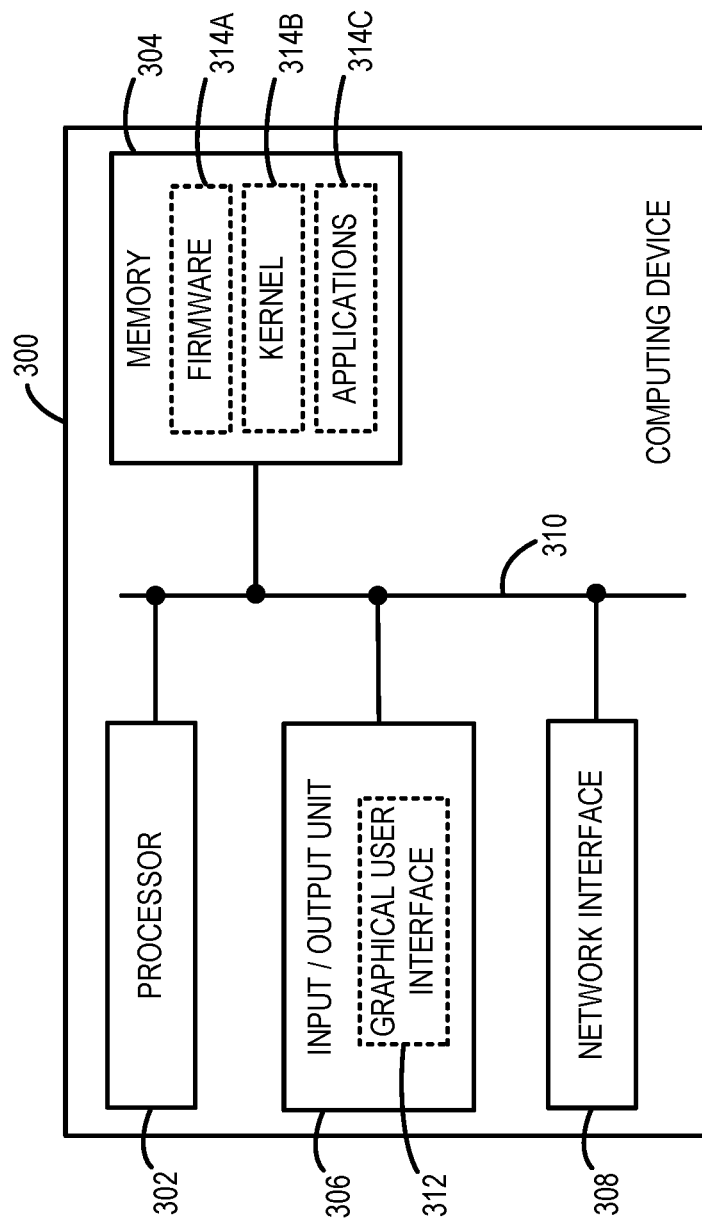
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104, develop control instructions, enable wireless communication with other devices, and/or perform other operations. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processor 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples. Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may have one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including rain rate and other weather conditions detection techniques using radar imagery.

Figure 4:
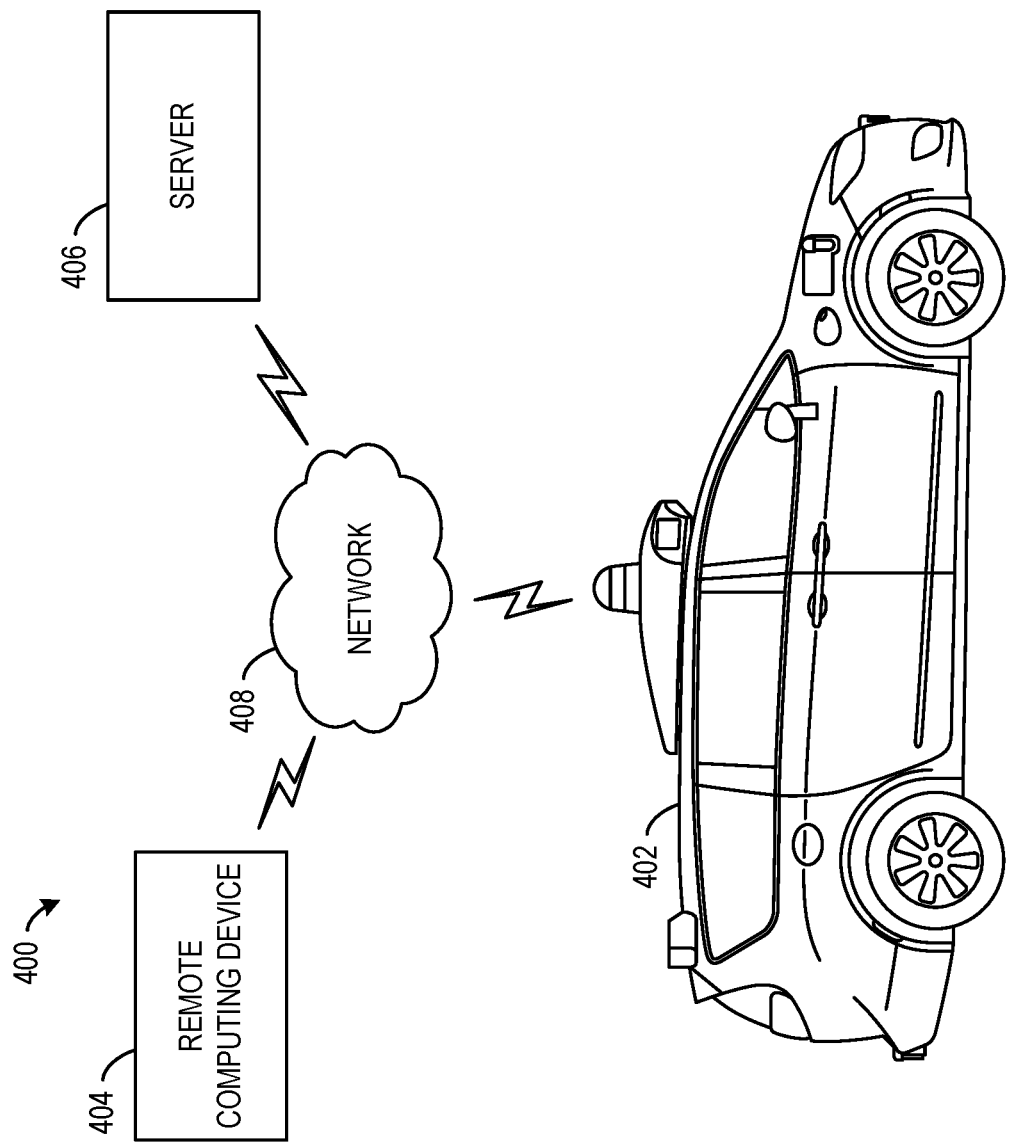
FIG. 4 is a system for wireless communication between a vehicle and computing devices, according to one or more example embodiments.

FIG. 4 is a system for wireless communication between computing devices and a vehicle, according to one or more example embodiments. Particularly, system 400 is shown with vehicle 402, remote computing device 404, and server 406 communicating wirelessly via network 408. System 400 may include other components not shown within other embodiments, such as firewalls and multiple networks, among others. System 400 may enable performance of disclosed techniques described herein.

Vehicle 402 may be configured to autonomously (or semi-autonomously) transport passengers or objects (e.g., cargo) between locations and may take the form of any one or more of the vehicles discussed above, including passenger vehicles, cargo shipping vehicles (e.g., trucks), farming and manufacturing vehicles, and dual-purpose vehicles. When operating in autonomous mode, vehicle 402 may navigate to pick up and drop off passengers (or cargo) between desired destinations by relying on sensor measurements to detect and understand the surrounding environment. In some embodiments, vehicle 402 can operate as part of a fleet, which may be managed by a central system (e.g., remote computing device 404 and/or other computing devices).

Remote computing device 404 may represent any type of device or devices configured to perform operations, including but not limited to those described herein. The position of remote computing device 404 relative to vehicle 402 can vary within examples. For instance, remote computing device 404 may have a remote position from vehicle 402, such as operating inside a physical building. In some implementations, operations described herein that are performed by remote computing device 404 may be additionally or alternatively performed by vehicle 402 (i.e., by any system(s) or subsystem(s) of vehicle 200).

In addition, operations described herein can be performed by any of the components communicating via network 408. For instance, remote computing device 404 may determine a route and/or operations for vehicle 402 to execute using information from vehicle 402 and/or other external sources (e.g., server 406). In some embodiments, remote computing device 404 may generate a GUI to display one or more selectable options for review by a remote operator.

Server 406 may be configured to wirelessly communicate with remote computing device 404 and vehicle 402 via network 408 (or perhaps directly with remote computing device 404 and/or vehicle 402). As such, server 406 may represent any computing device configured to receive, store, determine, and/or send information relating to vehicle 402 and the remote assistance thereof. Server 406 may be configured to perform any operation(s), or portions of such operation(s), that is/are described herein as performed by remote computing device 404 and/or vehicle 402. Some implementations of wireless communication related to remote assistance may utilize server 406, while others may not.

Network 408 represents infrastructure that can enable wireless communication between computing devices, such as vehicle 402, remote computing device 404, and server 406. For example, network 408 can correspond to a wireless communication network, such as the Internet or a cellular wireless communication network. The various systems described above may perform various operations. These operations and related features will now be described.

In some embodiments, vehicle 402 may communicate with remote computing device 404 and/or server 406 via network 408 to receive and/or provide information related to rain rate estimation techniques described herein. For example, vehicle 402 may communicate weather and location data detected during navigation to server 406 for storage and subsequent access by other vehicles. For instance, server 406 may maintain and update map data in real-time to reflect weather conditions experienced by vehicle 402 and other vehicles wirelessly communicating with server 406. Vehicle 402 may also communicate information related to rain rate and other weather conditions directly with other vehicles. For instance, vehicle 402 can be part of a convoy with other vehicles and share information related to road conditions with other vehicles within the convoy.

Figure 5:
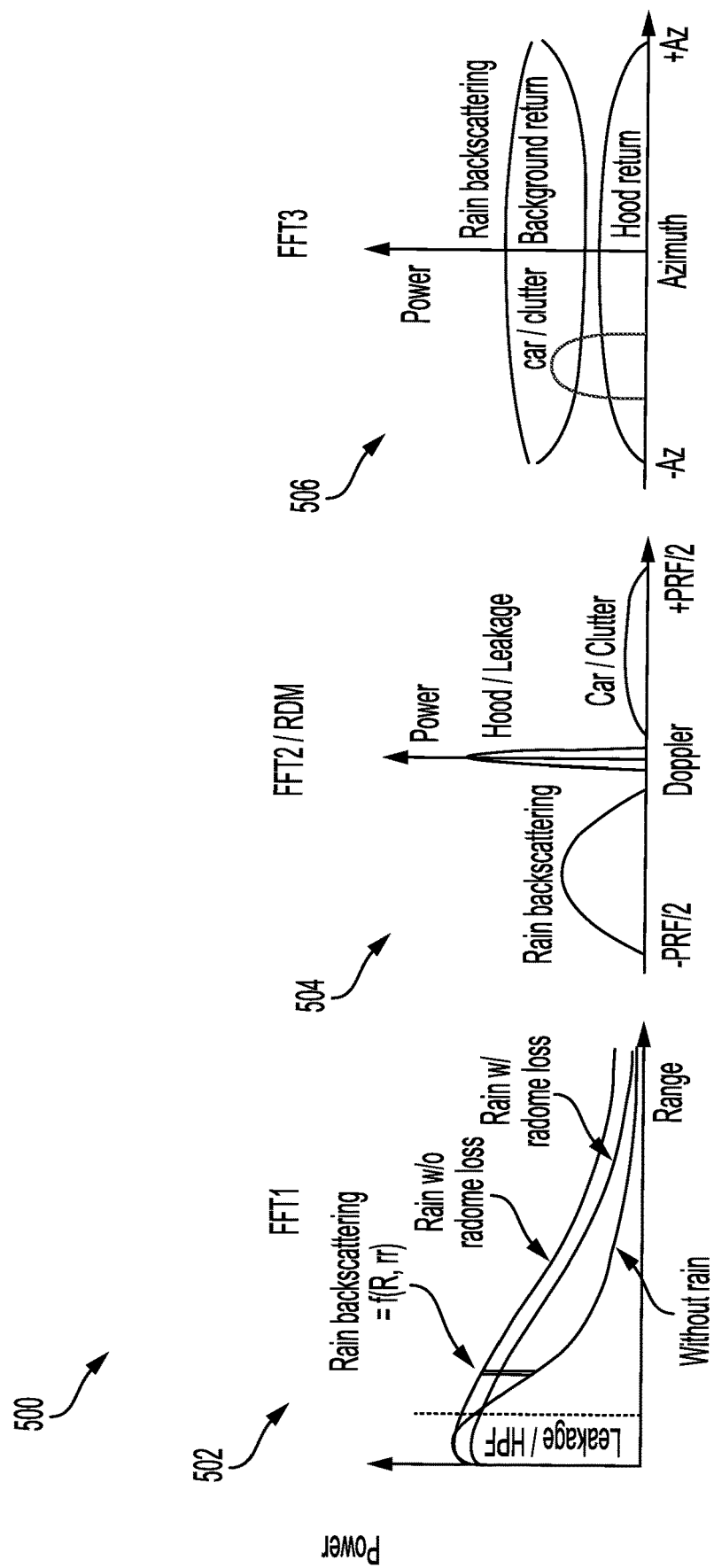
FIG. 5 depicts a Fast Fourier transforms (FFTs) series, according to one or more example embodiments.

Automotive radars may use a series of Fast Fourier Transforms (FFTs) and projections to form two-dimensional (2D) image representations of response power such as a range-Doppler map (RDM) (e.g., FFT2 504 shown in FIG. 5) and real-beam (range-azimuth) spatial map (e.g., FFT3 506 shown in FIG. 5). The advantage of using these products versus the result of the first stage (range response power in slow time) after pulse compression (for FMCW) or matched filter (for PSK) is the ability to reject static scatterers on the platform, clutter and objects in neighboring lanes from entering the excess energy computation. The use of Doppler components can provide selectivity that allows removal at near range of static objects on the vehicle that may incur a response and other DC leakage and at longer ranges from clutter. The use of azimuth components can provide selectivity allowing removal of objects with azimuths that may correspond to passing vehicles and other objects. For 4D radars, which additionally have elevation discrimination, the elevation component may allow further constraint by elevation bin selection by for example further restricting clutter. However, in practice, at the near ranges of interest (specifically where sensible volumetric rain backscatter power exceeds radar background power), the antenna's elevation gain pattern will reduce incorporation of clutter.

FIG. 5 depicts FFTs series 500 generated during radar operations, according to one or more example embodiments. For instance, a vehicle radar system can use FFTs series 500 to form 2D image representations of response power, such as a range-Doppler map (RDM) and range-azimuth spatial map. As shown in the example embodiment depicted in FIG. 5, FFTs series 500 includes FFT1 502, FFT2 504, and FFT3 506. In other examples, radar processing can involve using different FFTs or techniques not shown in FIG. 5.

FFT1 502 is shown as a graph with power represented on the Y-axis and range represented on the X-axis. The graph for FFT1 502 depicts the comparison between power levels across different ranges for rain backscattering, rain with radome loss, rain without radome loss and without rain. As such, FFT1 502 can show how rain can impact radar returns obtained via a radar unit (or multiple radar units).

FFT2 504 is shown as another graph that compares power levels (Y-axis) relative to Doppler (X-axis). The graph of FFT2 504 shows rain backscattering power relative to Doppler, hood/leak power relative to Doppler, and car/clutter power relative to Doppler.

FFT3 506 shows a graph that depicts power levels relative to azimuth. As shown, FFT3 506 depicts rain backscattering relative background return as well car/clutter return and hood return. This enables a comparison between power levels caused by rain, car/clutter, hood across different azimuths measured by the vehicle radar.

Figure 6A:
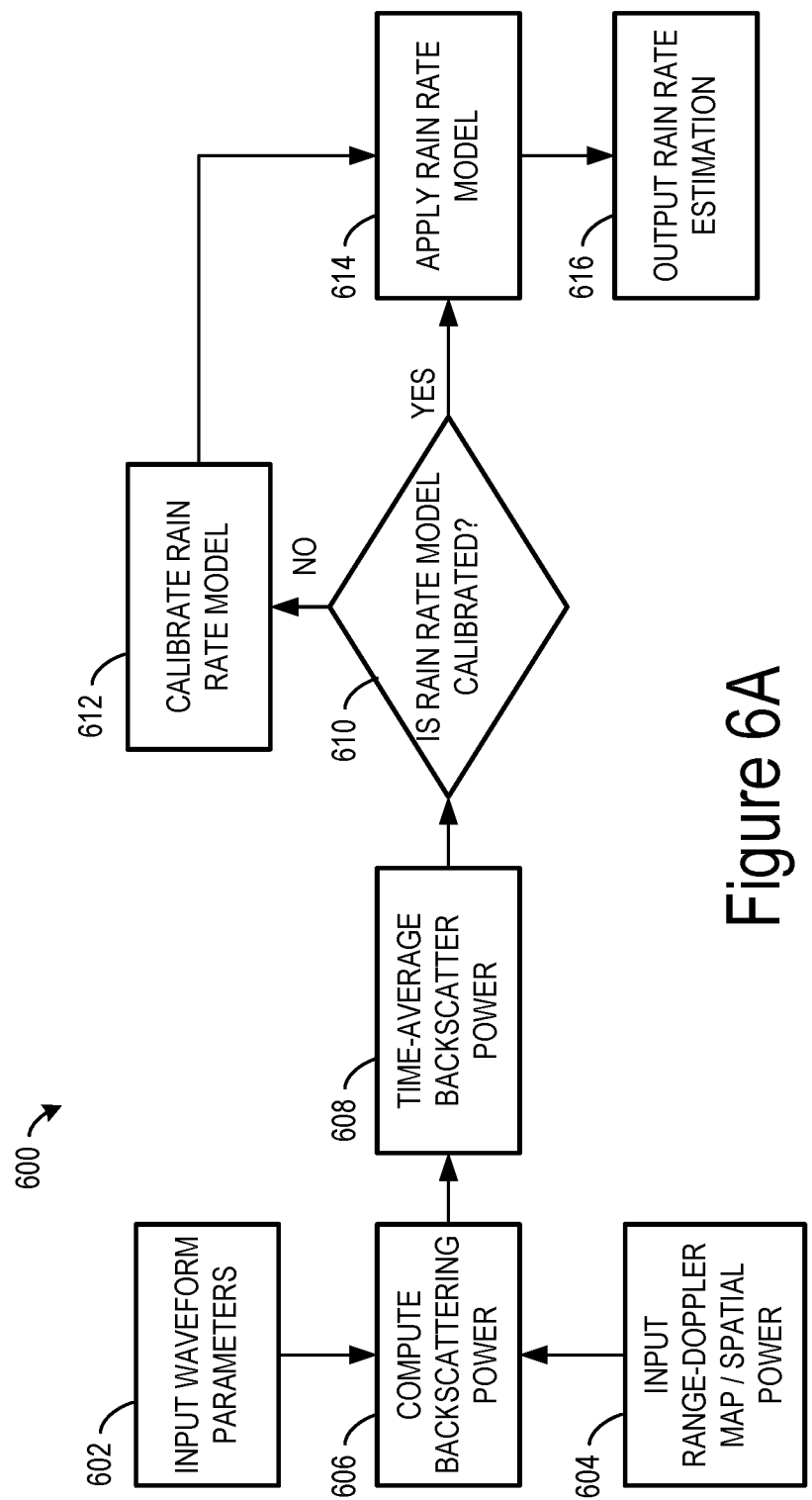
FIG. 6A illustrates a technique for rain rate estimation via radar imagery, according to one or more example embodiments.

FIG. 6A illustrates a technique for rain rate estimation via radar imagery, according to one or more example embodiments. Disclosed techniques can involve computing the elevated radar response power due to rain (water) backscattering directly on range-Doppler-azimuth filters of interest. Bins may be selected to minimize unwanted introduction of static responses, clutter and nearby vehicles. In addition, the power computation may use one or more radar sensors to reduce the false alarm energy caused by the environment. In addition, a time filtering selection algorithm or operation may be chosen on estimates to further reduce false positive signal. The combined backscatter power may be used in conjunction with a model fit (either theoretical and/or a linear regression fit against third-party data) to determine rain rate. The model may be periodically validated over time against third-party data or against other rain rate estimates of nearby vehicles. The model fit parameters may need to be updated if the rain rate estimates fail the validation.

As such, system 600 shown in FIG. 6A may perform disclosed rain rate estimation techniques, according to one or more example embodiments. In particular, a computing device located on a vehicle or remote from a vehicle may perform rain rate estimation techniques. The computing device can be a field programmable gate array associated with one or more vehicle radar units in some examples.

The computing device may initially obtain waveform parameters at block 602, which may be used to choose which waveforms enter the rain rate estimator. Range-Doppler maps and/or range-azimuth spatial map at block 604 are used to compute backscattering power at block 606. The computing device can then determine a time-average backscatter power at block 608 based on the backscattering power computed at block 606.

As further shown, the computing device may determine whether the rain rate model (or other type of model used) is calibrated at block 610. When the rain rate model is not calibrated, the computing device may proceed with calibrating the rain rate model at block 612 prior to using the rain rate model to evaluate the time-average backscatter power. For example, rain rate model calibration may occur onboard or offboard by generating the backscattering estimates at 608 and using calibrated rain rate estimates from other sources (such as vehicles in the area or third-party data) to generate the fit parameters $\alpha$, $\beta$ in [1] that minimizes the error obtained between the input backscattering estimates and the output truth data. If the rain rate model is calibrated at block 610, the computing device may proceed and apply the rain rate model as shown at block 614. Similarly, once the rain rate model is calibrated via block 612, the computing device can apply the rain rate model as shown at block 614. The computing device may then output a rain rate estimation at block 616 based on applying the rain rate model. For instance, the model can indicate when the time-average backscatter power indicates the presence of rain and an estimated rainfall rate. The rain rate can also indicate the frequency that precipitation influences radar returns received by one or more radar units.

The computing device performing blocks of system 600 may use Doppler and Angle discrimination, which can provide additional redundancy that reduces detectable signal and reduces confounding signals inside the field of view that may be caused by skin return of the vehicle (at zero-Doppler) or off to the side of the car where vehicles may be passing using knowledge of the radar mount locations and road-graph.

In some examples, the computing device may use particular range bins for estimating the rain rate. For instance, the computing device may use near-range bins, which may have a number of optimal properties improving the measurement signal-to-noise ratio (SNR). For example, there may be larger signal backscatter power for the measurement since volumetric rain backscattering decreases with range, there may also be less false positive energy from ground clutter since the elevation beamwidth of the radar may not extend to the ground at near ranges to the radar and there may be fewer on-road responses entering the near-range bins during navigation while cars maintain space to avoid collision. In some instances, however, the nearest range bins may have anomalous response power that is dominated by direct current (DC) leakage due to imperfect intermediate frequency (IF) filter suppression or other unwanted reflections (e.g., radome or radar cavity). As an example result, the computing device may choose to ignore the nearest range filters for frequency-modulated continuous-wave (FMCW) modulations.

Range resolutions used for estimations can differ within examples. For instance, range resolution of less than one meter may be used. In particular, choosing physically smaller range bins may improve rain rate estimation quality. For example, DC leakage (a process that causes increased noise at low IF or receive frequencies) may be confined to one or more of the first (nearest) range bins and thus these bins may need to be omitted from entering the rain rate estimator. However, near range estimates may be preferred and thus the usage of physically smaller range bins may permit estimates to be made at physically nearer ranges to the radar. For example, the backscatter signal is higher at near ranges, meaning a larger effective estimator SNR may be achieved. Additionally, range resolution can affect the number of bins that amount of unintended energy that nearby scatterers such as vehicle response may add to the estimator. That is, selection of physically smaller range bins may serve to localize unwanted scatterers which ultimately makes it easier to remove outliers through the selection of statistical operations used to form the backscatter estimate.

In some cases a specialty waveform or processing may be designed and/or used to improve rain rate estimation. For example, the waveform may be designed to use a physically smaller range resolution and/or reduce radar timeline (e.g., using fewer samples per pulse, fewer pulses, or fewer time division periods). In some cases, to improve the focus in the near field of the radar, a separate set of calibrations and/or digital signal processing (DSP) operations may be run on the analog-to-digital converter (ADC) samples to render higher quality near-range, range-Doppler and/or range-azimuth spatial images for the purpose of applying similar rain rate estimation techniques.

The rain backscattering metric used by the computing device can vary within example embodiments. A statistical approach may involve using range-Doppler map, which can include a power average over Doppler bins at a set number of range bins. Guard Doppler bins may be added to reduce impact from the vehicle's skin return on the estimator applied via the computing device. Another statistical approach can involve using range-azimuth spatial maps for a specific set of azimuth filters, which can face directions optimized to reduce backscattering from other vehicles entering the radar field of regard. With a selection of one or more range bins, an average can be computed or minimum power of the filters can be used.

Depending on the waveforms selected, one or many sets of unique waveform parameters (bandwidth, ramp rate or center frequency) may be chosen to integrate into the final backscatter computation. That is, the computing device can perform rain rate estimation differently depending on the waveforms used via transmission and reception. One or more sensors may be integrated within a set of waveforms or at the same time to produce a sensor-averaged measurement. This can be used to increase the accuracy of the estimation and/or make it more stable to large scatterers or radio frequency interference (RFI) in the environment that might occur for a short duration of time. Alternatively, to reduce the likelihood of false positive estimations, the minimum several of the sensor measurements may be taken. In addition, depending on the required frequency estimate passed to the vehicle's downstream systems, multiple individual estimates may be power-averaged to form a time-smoothed backscatter power estimate.

At any point in the above processing chain, the estimates may first be converted using the model fit described in the next section and then the rain rates may be averaged.

Rain droplet distributions can be analyzed in different ways within example implementations. For instance, rain droplet sizes can be analyzed as a function of rain rate. In some examples, analytical Droplet Size Distribution (DSD) models can be used. Common techniques involve assuming spherical droplets and computing the numerical integral for a carrier frequency of interest. A general power law fit can involve using:

$$\eta = \alpha R^\beta \quad [1]$$

where $\eta$ is the backscatter coefficient in square meters per cubic meters, R is rainfall rate in mm/h and $\alpha$ and $\beta$ are empirical best fit coefficients that are modeled. The value of $\beta$ varies slightly over the automotive frequency band. An empirical fit can be found using a calibration routine. A linear regression model is fit on the resulting log-log plot to determine the coefficients, $\alpha$ and $\beta$.

Depending on the radar sensor and architecture, calibration may be needed to be performed at a wide range of frequencies (once or periodically over radar lifecycle) and number of units (such as per-sensor or per-part-number). When the part does need to be calibrated, a number of different calibration sources may be used to fit the empirical model. Calibration may involve finding a nearby weather station with local data that can be compared with the sensor data. In addition, the computing device may use a local calibrated disdrometer (either trailing or in a static scene). In some instances, calibration can involve using a calibrated rain rate estimator from another car or set of cars in proximity to the car's sensors requiring calibration.

The computing device can also perform calibration data (time) alignment techniques. The sensor data is then integrated into time bins of the weather metrology data. In some instances, the computing device may downsample onboard data. A correlation process may then be done to determine the time alignment of the trends and determine if the metrology set is of good enough quality to curve fit the model since weather station data may be time shifted or deemed inaccurate. Generally, a wide range of rates can be included for the model fit to increase the accuracy of results.

Many systems on the self-driving car may use the rain rate estimate information to make more informed decisions. An example of the consumers and handoff of the rain rate estimation is shown below. After computing the estimated rain rate, the radar system may compute the estimated atmospheric loss due to rain using one or more models. The models may specify atmospheric loss in dB/km which then needs to be multiplied by 2 times the target range (to account for round-trip distance). Other sensors may also model performance degradation effects based on estimated rain rate.

Following the determination of the rain rate loss, the radar performance model may be adjusted to account for loss reductions from rain rate and any other losses such as radome loss by using the radar radar range equation. The output is the rain-degraded radar performance model that can be supplied to other data consumers. For individual vehicles, real-time knowledge of sensor performance impairments from the environment rain can be used to estimate sensor performance degradation and for engaging cleaning systems to counteract aperture fouling in rain. The resulting models may further inform downstream perception models on how to weight data and assist in vehicle behavior decisions and navigation control systems.

Figure 6B:
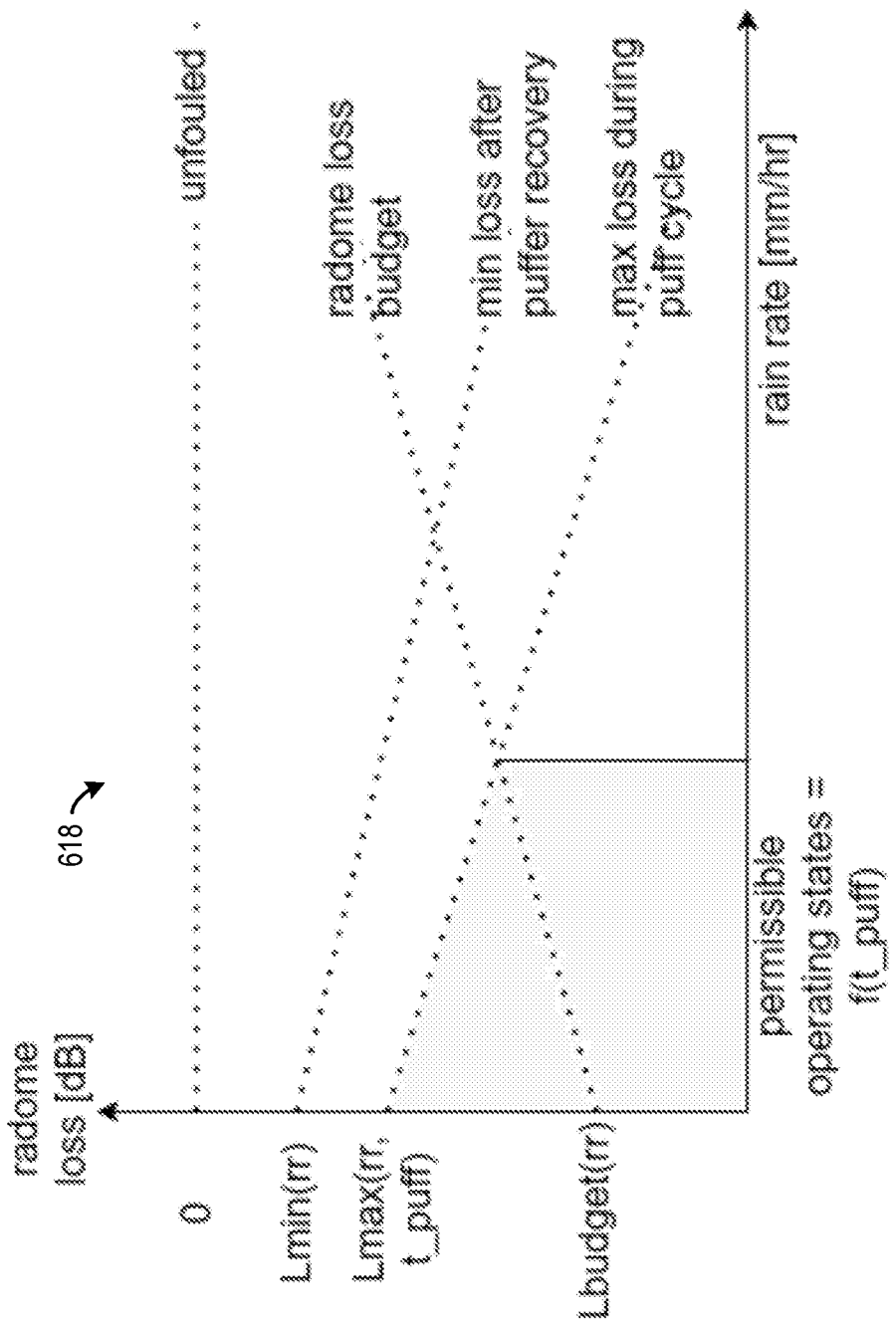
FIG. 6B illustrates a model of radome loss with cleaning system recovery (loss versus rain rate), according to one or more example embodiments.

For an active cleaning system, it is important to understand when to actuate the cleaning system (in particular when to first actuate the cleaning system and the frequency of actuation) in order to maintain a certain state of aperture cleanliness, which may be related via a model to other system requirements. FIG. 6B illustrates an example model of radome loss with cleaning system recovery (loss versus rain rate). For instance, a puffer may be the cleaning system modeled in FIG. 6B.

If the sensor degradation rate is a known function of the rain rate (for example, a linear aperture fouling relationship), a time-based aperture fouling model may be found. The aperture state may then be modeled and the appropriate frequency or time between cleaning actuation may be set by the maximum allowable fouled state of the aperture (which may be so defined to keep the radars within an aperture loss specification) and the current rain rate estimate. For example, radar using an air puffer (e.g., an intermittent, active cleaning device) system, the rain rate may be used to determine the repetition frequency of the puffer actuation.

In some examples, a network of car rain gauges can be used. Onboard rain rate estimates may be shared to produce real-time rain maps to redirect vehicles to areas where sensors will be less affected by environmental impacts or may be used to alert the fleet that a weather event is substantial enough (exceeds ODD) to ground the fleet or restrict routes while the rain event passes. Distributed real-time rain maps may involve multiple vehicles with radar that can be calibrated in real-time and operate in a local environment. A plurality of self-driving vehicles all employed with radars and calibrated real-time rain estimation software are active in a local environment. Each vehicle has knowledge of its own location and uploads to a central database including position and rain rate estimation data. A central database uses the information along with available weather data to predict areas. The database may incorporate or interact with other third-party or government data sources to supplement areas with incomplete vehicle coverage.

Based on the rain map, a system may reroute (to improve SDC performance) or may cancel trips or otherwise delay trips based on conditions exceeding the ODD.

Figure 6C:
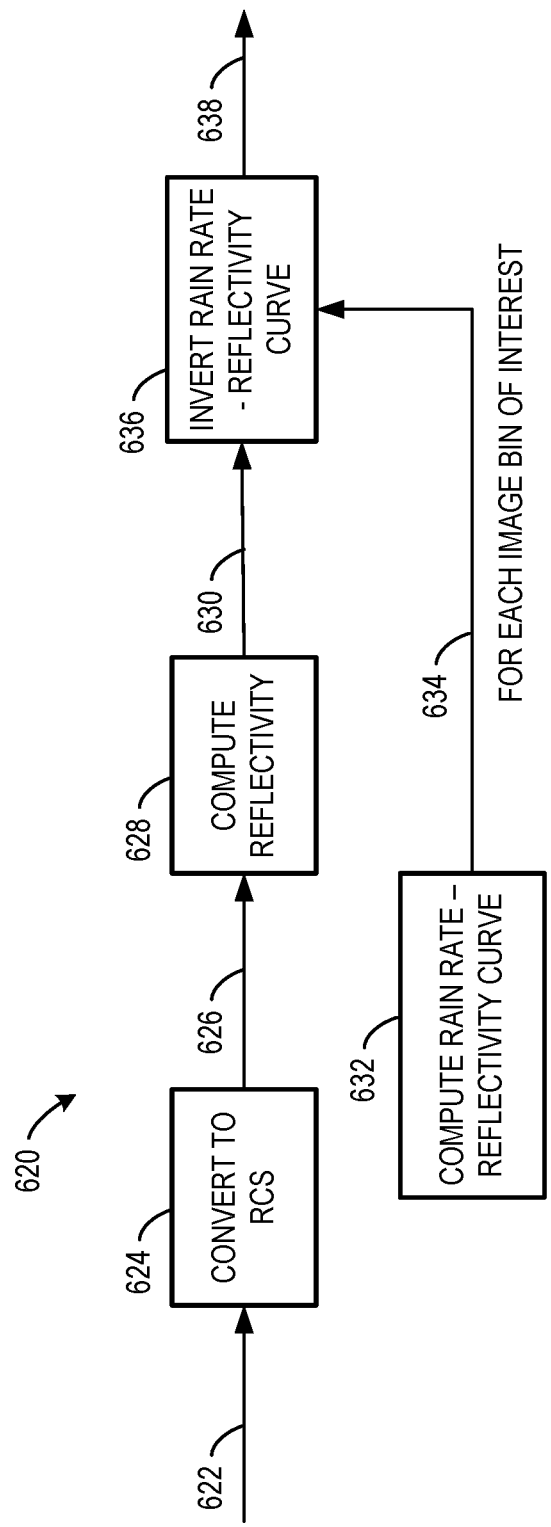
FIG. 6C illustrates another rain rate estimation technique, according to one or more example embodiments.

FIG. 6C illustrates technique 620 for converting measured backscatter power from radar imagery into a rain rate estimation, according to one or more examples. One or more computing devices may perform technique 620 shown in FIG. 6C. For instance, a combination of FPGAs and other types of computing devices may be used in some examples. The computing device or devices may use select image bins of interest from radar images to analyze for rain rate estimation, such as bins of interest represented in FFT2 504 and FFT3 506 shown in FIG. 5. As such, technique 620 can be repeated iteratively by one or more computing devices for all bins under consideration in some examples.

Technique 620 involves using standard radar image processing techniques to compute response power in radar units at discrete range-Doppler-azimuth cells. The raw radar response power ($\square_{\square\square\square,\square\square\square}$ [$\square\square$]) from select radar image bins (considered to have high backscatter SNR) enter at block 622, and make use of a calibrated RCS model (which may be calibrated for each radar offboard in a chamber or calibrated onboard) at block 624 to convert the raw radar power into a standardized RCS value ($\sigma_b$ [dBsm]) at block 626. At block 628, waveform parameters, processing information including FFT oversampling, information about antenna beamwidths and bin index are used to compute the image bin volume ($\square_{\square\square\square}$ [$\square^3$]) and through division the RCS is converted to reflectivity ($\eta_\square$ [$\square\square\square^{-1}$]), which is then output at block 630.

Technique 620 may then require an auxiliary input (possibly precomputed and stored in memory in the form of a lookup table) of rain rate—rain reflectivity model at block 632 in FIG. 6C. (Alternatively, an empirical method for this curve was outlined in Equation [1]). A numerical method is repeated for each discretized rain rate value for which the rain rate-reflectivity model is computed. For each rain rate that is computed, a computation may be repeated for a set of discretized bin diameters representing rain droplet size bins (for example, rain droplet bins can be in the 0-10 mm range). Next, two sub-computations must be made, each as a function of droplet diameter. First, a drop-size distribution may be computed to determine the droplet probability density in the discretized rain droplet bins. Second, the dielectric constant of the spherical water of the droplet size and incident RF wavelength is used with Mie Scattering theory to estimate backscattering response. Next, for each rain rate estimate, the computing device can then compute the integrated backscattering power by summing the backscattering power by drop-size bin and the probability density of the drop-size bin. The completion of these numerical routines can then produce a curve that relates backscatter reflectivity to rain rate. In some instances, the theoretical model may be numerically enhanced using empirical corrections (hybrid approach) to improve rain rate estimates.

Technique 620 then involves inverting rain rate-reflectivity curve in block 636, which can involve using the reflectivity estimate from block 630 and determining the rain rate based on the rain reflectivity model from block 634. In some examples, while the backscattering and extinction spectra aren't monotonic for a single droplet size, when considering a distribution of droplets, the spectra are monotonic, leading to unique solutions for each inversion. Technique 620 can further involve computing a rain rate summary statistic by weighting and adding together the bin estimates of rain rate. Alternatively, ordering may be reversed where a summary statistic of backscatter power is found first, then the model is inverted to find the rain rate estimate. In some examples, the computing device may combine all radar sensor estimates to produce a global rain rate estimation. Time filtering can then be done.

An iterative approach will be needed to estimate the rain rate from the theoretical reflectivity model. The search algorithm will invert the theoretical reflectivity as a function of rain rate using the estimated reflectivity as an input. The output will be an estimate of the rain rate. In one approach, a summary statistic for all single range-azimuth cells' rain rate estimates may then be used to determine the estimated rain rate for the current CPI, for the current sensor. In some cases, the summary statistic may also incorporate non-uniform weightings as determined from an external algorithm. In another approach, a summary reflectivity may first be computed then inverted to form the rain rate estimate.

Figure 7:
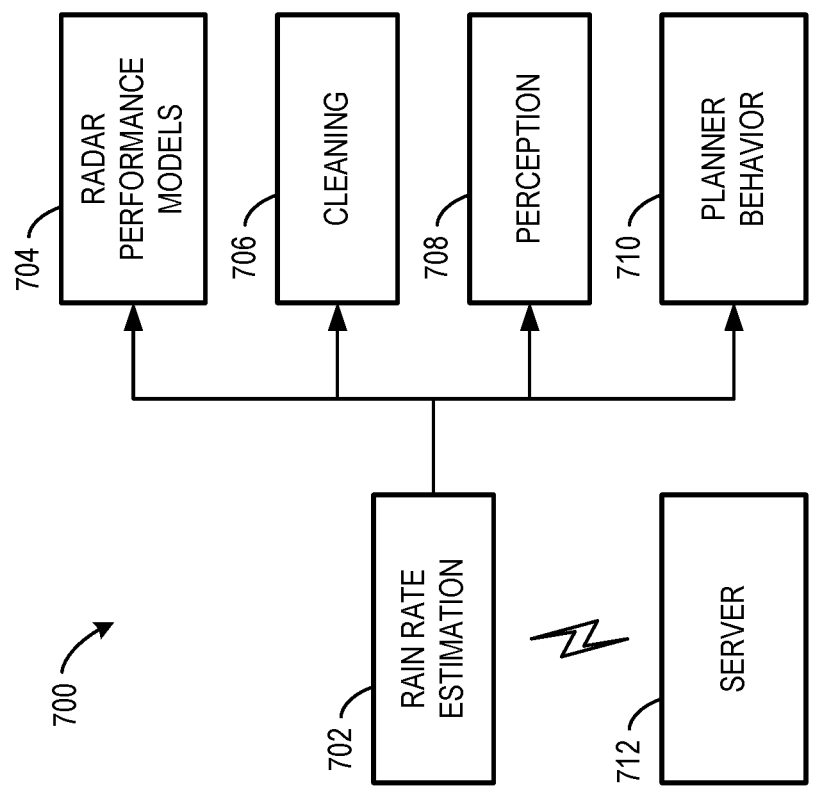
FIG. 7 illustrates a system for estimating weather conditions in a vehicle's environment, according to one or more example embodiments.

FIG. 7 illustrates a system 700 configured to use rain rate estimations, according to one or more example embodiments. System 700 includes rain rate estimation module 702, radar performance models 704, cleaning module 706, perception module 708, planner module 710, and server 712. System 700 can include other elements in other examples.

System 700 may include one or more computing devices configured to perform operations disclosed herein. For instance, computing device 300 shown in FIG. 3 may operate as part of system 700. In some cases, system 700 may exist completely onboard a vehicle, such as vehicle 100 shown in FIG. 1. In other examples, system 700 may include some components that operate remotely from the vehicle.

Rain rate estimation module 702 represents a subsystem that can perform different operations related to estimating weather conditions in the environment of one or more vehicles. In some examples, rain rate estimation module 702 can perform disclosed operations to estimate a rate of snowfall or other weather conditions in a vehicle's environment.

Radar performance models 704 represents one or more models that vehicle systems may use to process and use radar data from a vehicle radar system. Rain rate estimates may be used to create a range-dependent transmission loss estimate for the radar. The loss estimates may be used to modify radar performance models and may be used to modify the radar detection logic and thresholds over the radar's field of view. The radar system may further augment the loss models by estimating through direct or indirect means, aperture loss effects before handing off the radar models to other vehicle systems.

Cleaning module 706 represents a subsystem on a vehicle that can be used to clean one or more sensors during vehicle navigation. For instance, cleaning module 706 can use heat applications, puffers, fans, wipers, and/or other types of cleaning equipment to enable sensors to obtain sensor data of the vehicle's environment. Cleaning module 706 may adjust performance based on weather conditions in the system's environment. For instance, cleaning module 706 may use signals from rain rate estimation module 702 to initiate or adjust sensor cleanings.

Perception module 708 may include sensor data from vehicle sensors to understand the vehicle's environment. Perception module may for example use as an input the rain-loss-corrected radar performance model or a derived input such as rain-corrected max radar range for evaluating the quality (or alternatively degradation) of sensor data subject to the current environmental conditions. Perception module 708 can enable vehicle systems to determine various aspects of the vehicle's environment, including position and motion of nearby objects, boundaries, etc. Planner module 710 may represent a subsystem for a vehicle that enables autonomous navigation. For instance, planner module 710 may determine safe routes based on data from perception module 708 and enable navigation of the routes.

Server 712 represents a remote computing device that can perform disclosed operations herein. For instance, server 712 can store rain rates received from vehicles positioned at various locations and compile a weather map that can be distributed to the vehicles for route planning.

Figure 8:
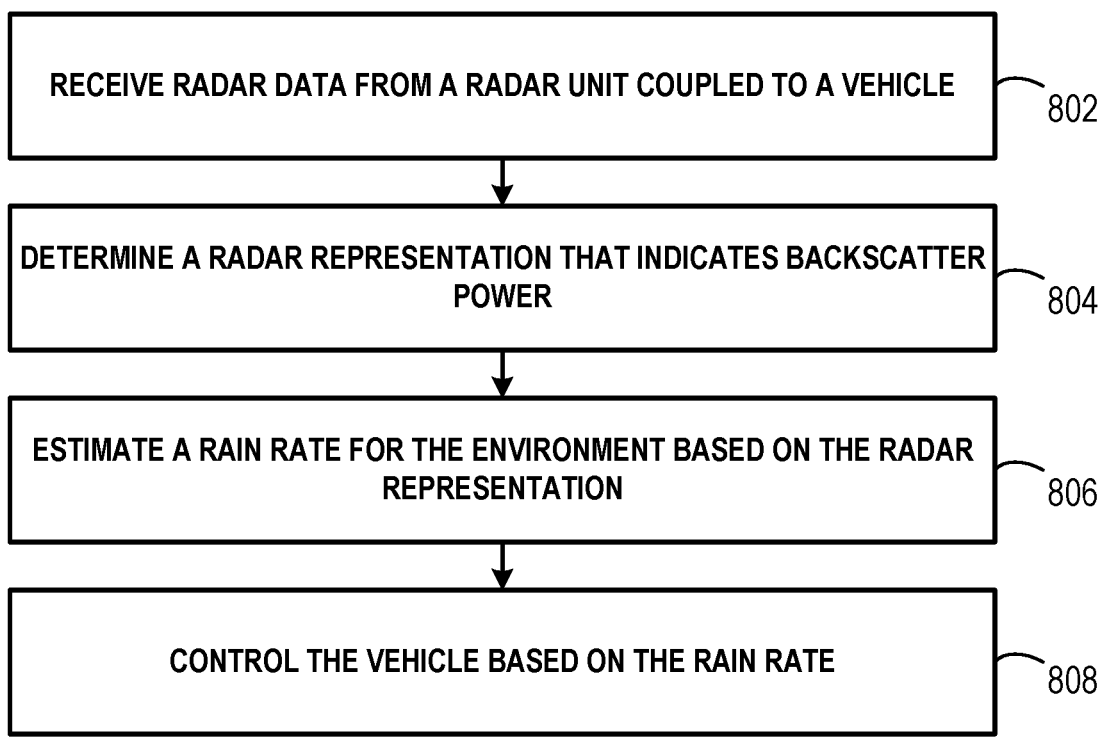
FIG. 8 is a flow chart of a method for estimating rain rate, according to one or more example embodiments.

FIG. 8 is a flow chart of a method for rain rate estimation using radar, according to one or more example embodiments. Method 800 represents an example method that may include one or more operations, functions, or actions, as depicted by one or more of blocks 802, 804, 806, and 808, each of which may be carried out by any of the systems, devices, and/or vehicles shown in FIGS. 1-7, among other possible systems. For instance, the computing device depicted in FIG. 3 may perform method 800.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as may be understood by those reasonably skilled in the art.

At block 802, method 800 involves receiving radar data from a radar unit coupled to a vehicle. The radar data represents the environment of the vehicle.

At block 804, method 800 involves determining a radar representation that indicates backscatter power based on the radar data. In some embodiments, the computing device can compute backscatter power based on the radar data and determine a time-average backscatter power based on the computed backscatter power. The computing device may then determine the radar representation based on the time-average backscatter power.

In some embodiments, the computing device may determine one or more two-dimensional (2D) radar images having pixels that indicate backscatter power. For instance, the computing device may determine range-Doppler images having pixels that indicate backscatter power and/or range-azimuth spatial images having pixels that indicate backscatter power.

At block 806, method 800 involves estimating a rain rate for the environment based on the radar representation. The computing device can use a rain rate model (or multiple rain rate models) to estimate the rain rate for the environment. In some cases, the computing device may be configured to determine whether the rain rate model requires calibration. Based on determining that the rain rate requires calibration, the computing device may perform a calibration process prior to estimating the rain rate for the environment.

In some embodiments, the computing device may perform a comparison between the pixels in the one or more 2D radar images and power levels indicated by the rain rate model. Based on the comparison, the computing device may estimate the rain rate for the environment.

In some embodiments, the computing device may perform a comparison between the time-average backscatter power and backscatter power levels represented by the rain rate model. The computing device may then estimate the rain rate for the environment based on the comparison.

At block 808, method 800 involves controlling the vehicle based on the rain rate. In some embodiments, the computing device may trigger a sensor cleaning process for one or more sensors. The computing device can also adjust parameters of one or more vehicle systems based on the rain rate.

In some cases, the computing device may determine that the rain rate for the environment is above a threshold rain rate. As such, the computing device may control the vehicle according to an increased following distance relative to other vehicles in the environment based on determining that the rain rate is above the threshold rain rate.

In some embodiments, the computing device may determine a current location of the vehicle and provide the rain rate and an indication of the current location of the vehicle to one or more remote computing devices. For instance, the computing device may provide the rain rate and its location to other vehicles and/or a central system that can use the rain rate to adjust routes. Similarly, the computing device may also receive a given rain rate and an indication of a current location of another vehicle from the vehicle. The given rain rate may correspond to the environment of the second vehicle. As such, the computing device can determine that the given rain rate exceeds a threshold rain rate and adjust a route of the vehicle to avoid the current location of the second vehicle.

In some examples, sensors at different locations on the vehicle can be used for weather detections in various ways. For instance, forward-facing radar units can be used to estimate rain rate and rear-facing radar units can be used to estimate road spray, etc.

Figure 9:
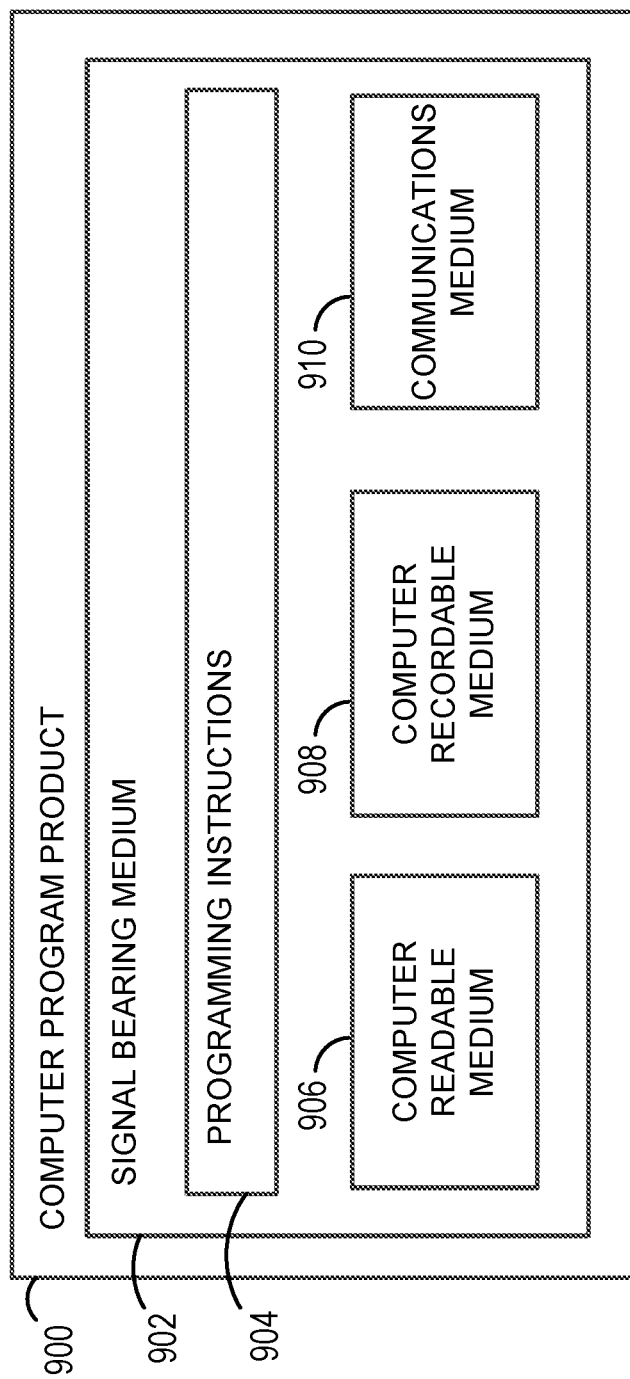
FIG. 9 is a schematic diagram of a computer program, according to one or more example embodiments.

FIG. 9 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 900 is provided using signal bearing medium 902, which may include one or more programming instructions 904 that, when executed by one or more processors may provide functionality or portions of the functionality described above with respect to FIGS. 1-8. In some examples, signal bearing medium 902 may encompass non-transitory computer-readable medium 906, such as, but not limited to, a hard disk drive, a Compact Disc (CD), a Digital Video Disk (DVD), a digital tape, memory, etc. In some implementations, signal bearing medium 902 may encompass computer recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, signal bearing medium 902 may be conveyed by a wireless form of communications medium 910.

Programming instructions 904 may be, for example, computer executable and/or logic implemented instructions. In some examples, a computing device (e.g., computing system 112 shown in FIG. 1 or the computing device 300 shown in FIG. 3) may be configured to provide various operations, functions, or actions in response to programming instructions 904 conveyed to computer system 112 by one or more of computer readable medium 906, computer recordable medium 908, and/or communications medium 910. Other devices may perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   receiving, at a computing device, radar data from a radar unit coupled to a vehicle, wherein the radar data represents an environment of the vehicle;
   based on the radar data, determining one or more two-dimensional (2D) radar images having pixels that indicate backscatter power;
   performing a comparison between power levels of the pixels in the one or more 2D radar images and power levels indicated by a rain rate model;
   estimating, by the computing device, a rain rate for the environment based on the comparison; and
   controlling the vehicle based on the rain rate.

2. The method of claim 1, further comprising:
   computing backscatter power based on the radar data;
   determining a time-average backscatter power based on the computed backscatter power; and
   determining the one or more 2D radar images based on the time-average backscatter power.

3. The method of claim 2, wherein performing the comparison between power levels of the pixels in the one or more 2D radar images and power levels indicated by the rain rate model comprises:
   performing a comparison between the time-average backscatter power and backscatter power levels represented by the rain rate model; and
   estimating the rain rate for the environment based on the comparison.

4. The method of claim 1, wherein determining the one or more 2D radar images having pixels that indicate backscatter power comprises:
   determining range-Doppler images having pixels that indicate backscatter power.

5. The method of claim 1, wherein determining the one or more 2D radar images having pixels that indicate backscatter power comprises:
   determining range-azimuth spatial images that indicate backscatter power.

6. The method of claim 1, further comprising:
   determining whether the rain rate model requires calibration; and
   based on determining that the rain rate model requires calibration, performing a calibration process prior to estimating the rain rate for the environment.

7. The method of claim 1, further comprising:
   based on the rain rate, triggering a sensor cleaning process for one or more sensors.

8. The method of claim 1, further comprising:
   determining that the rain rate for the environment is above a threshold rain rate; and
   wherein controlling the vehicle based on the rain rate comprises:
   based on determining that the rain rate is above the threshold rain rate, controlling the vehicle according to an increased following distance relative to other vehicles in the environment.

9. The method of claim 1, further comprising:
   determining a current location of the vehicle; and
   providing the rain rate and an indication of the current location of the vehicle to one or more remote computing devices.

10. The method of claim 1, further comprising:
    receiving, from a second vehicle, a given rain rate and an indication of a current location of the second vehicle, wherein the given rain rate corresponding to an environment of the second vehicle;
    determining that the given rain rate exceeds a threshold rain rate; and
    adjusting a route of the vehicle to avoid the current location of the second vehicle.

11. The method of claim 1, wherein the rain rate model is an empirical model fit against meteorology truth data.

12. The method of claim 1, further comprising:
    determining, based on the estimated rain rate, a max range value for the radar; and
    reducing a speed of the vehicle based on the max range value determined for the radar.

13. The method of claim 1, further comprising:
    providing the estimated rain rate to a remote computing system, wherein the remote computing system is configured to update map data to convey the estimated rain rate for an area corresponding to a location of the vehicle.

14. A system comprising:
    a vehicle having a radar unit;
    a computing device configured to:
    receive radar data from the radar unit, wherein the radar data represents an environment of the vehicle;
    based on the radar data, determine one or more two-dimensional (2D) radar images having pixels that indicate backscatter power;
    perform a comparison between power levels of the pixels in the one or more 2D radar images and power levels indicated by a rain rate model;

estimate a rain rate for the environment based on the comparison; and control the vehicle based on the rain rate.

15. The system of claim 14, wherein the computing device is further configured to:

compute backscatter power based on the radar data;

determine a time-average backscatter power based on the computed backscatter power; and determine the one or more 2D radar images radar representation based on the time-average backscatter power.

16. The system of claim 15, wherein the computing device is further configured to:

perform a comparison between the time-average backscatter power and backscatter power levels represented by the rain rate model; and estimate the rain rate for the environment based on the comparison.

17. The system of claim 14, wherein the computing device is further configured to:

determine range-Doppler images having pixels that indicate backscatter power.

18. The system of claim 14, wherein the computing device is further configured to:

determine range-azimuth spatial images that indicate backscatter power.

19. The system of claim 14, wherein the computing device is further configured to:

adjust parameters of one or more vehicle systems based on the rain rate.

20. A non-transitory computer readable medium configured to store instructions, that when executed by a computing device, causes the computing device to perform operations comprising:

receiving radar data from a radar unit coupled to a vehicle, wherein the radar data represents an environment of the vehicle;

based on the radar data, determining one or more two-dimensional (2D) radar images having pixels that indicate backscatter power;

performing a comparison between power levels of the pixels in the one or more 2D radar images and power levels indicated by a rain rate model;

estimating a rain rate for the environment based on the comparison; and controlling the vehicle based on the rain rate.

* * * * *